(12) United States Patent
Zhao et al.

(10) Patent No.: US 10,250,057 B2
(45) Date of Patent: Apr. 2, 2019

(54) POWER SUPPLY INCLUDING BI-DIRECTIONAL DC CONVERTER AND CONTROL METHOD THEREOF

(71) Applicant: Silergy Semiconductor Technology (Hangzhou) Ltd., Hangzhou (CN)

(72) Inventors: Chen Zhao, Hangzhou (CN); Lingdong Zhang, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 311 days.

(21) Appl. No.: 14/694,254

(22) Filed: Apr. 23, 2015

(65) Prior Publication Data

US 2015/0311720 A1 Oct. 29, 2015

(30) Foreign Application Priority Data

Apr. 23, 2014 (CN) .......................... 2014 1 0166959
Apr. 25, 2014 (CN) .......................... 2014 1 0174091

(51) Int. Cl.
*H02J 9/06* (2006.01)
*H02J 7/00* (2006.01)
(Continued)

(52) U.S. Cl.
CPC .......... *H02J 7/0068* (2013.01); *H02J 7/0052* (2013.01); *H02J 7/022* (2013.01); *H02M 3/1582* (2013.01)

(58) Field of Classification Search
CPC ........ H02J 7/0068; H02J 7/0052; H02J 7/022; H02M 3/1582
(Continued)

(56) References Cited

U.S. PATENT DOCUMENTS 5,631,814 A * 5/1997 Zak .......................... H02J 9/061
307/66
6,160,722 A * 12/2000 Thommes ............... H02J 9/061
307/68
(Continued)

FOREIGN PATENT DOCUMENTS

CN 200962528 Y 10/2007
CN 101355260 A 1/2009
(Continued)

OTHER PUBLICATIONS

First Chinese Office Action, including Search Report, for Chinese Patent Application No. 201410174091.0, dated Sep. 30, 2015, 14 pages.
(Continued)

*Primary Examiner* — Brandon S Cole
(74) *Attorney, Agent, or Firm* — Westman, Champlin & Koehler, P.A.

(57) ABSTRACT

A power supply including a bi-directional DC converter and a control method thereof are disclosed herein. The power supply includes first to third terminals, first and second semiconductor switches and a mode switching means. The first terminal is electrically coupled to an external power source. The second terminal is electrically coupled to a load. The third terminal is electrically coupled to a battery. The first and second semiconductor switches are electrically coupled in series between the first and second terminals. The mode switching means is electrically coupled to the first semiconductor switch, the second semiconductor switch and a bi-directional DC converter, respectively. The bi-directional DC converter is further electrically coupled to an intermediate node between the first semiconductor switch and the second semiconductor switch, and to the third terminal. The bi-directional power supply is operative to switch between a first operating mode in which the battery
(Continued)

is charged and a second operating mode in which the battery supplies power to the load. In the power supply, the mode switching means operates the first and second semiconductor switches so that a single chip has both the function of charging and the function of supplying power.

24 Claims, 2 Drawing Sheets

(51) Int. Cl.
*H02M 3/04* (2006.01)
*H02J 9/00* (2006.01)
*H02P 3/14* (2006.01)
*H02M 7/00* (2006.01)
*H02J 7/02* (2016.01)
*H02M 3/158* (2006.01)

(58) Field of Classification Search
USPC .................................................. 307/43–87
See application file for complete search history.

(56) References Cited

U.S. PATENT DOCUMENTS

| | | | | |
|---|---|---|---|---|
| 6,483,730 B2* | 11/2002 | Johnson, Jr. | ............ | H02J 9/061 307/66 |
| 6,587,356 B2* | 7/2003 | Zhu | ........................ | H02M 1/34 323/908 |
| 6,605,879 B2* | 8/2003 | Wade | ...................... | H02J 9/062 307/66 |
| 6,879,137 B2 | 4/2005 | Sase et al. | | |
| 6,906,933 B2* | 6/2005 | Taimela | .................... | H02J 3/32 363/34 |
| 7,050,312 B2* | 5/2006 | Tracy | ...................... | H02J 9/062 307/66 |
| 7,911,085 B2* | 3/2011 | Ho | .......................... | H02J 9/005 307/64 |
| 9,106,103 B2* | 8/2015 | Paulakonis | ............. | H02J 7/345 |
| 9,570,939 B2* | 2/2017 | Chang | .................... | H02J 9/062 |
| 2005/0201127 A1* | 9/2005 | Tracy | ...................... | H02J 9/062 363/37 |
| 2009/0289504 A1* | 11/2009 | Ho | .......................... | H02J 9/005 307/66 |
| 2011/0140520 A1* | 6/2011 | Lee | .................. | H01L 31/02021 307/25 |
| 2011/0175451 A1* | 7/2011 | Moon | ..................... | H02J 9/062 307/66 |
| 2012/0112547 A1* | 5/2012 | Ghosh | .................... | H02J 9/062 307/66 |
| 2014/0084817 A1* | 3/2014 | Bhavaraju | ............. | B60L 11/005 318/139 |
| 2015/0270744 A1* | 9/2015 | Lacarnoy | ................ | H02J 9/061 307/66 |

FOREIGN PATENT DOCUMENTS

| | | |
|---|---|---|
| CN | 102474200 A | 5/2012 |
| CN | 202260508 U | 5/2012 |
| CN | 103259433 A | 8/2013 |
| CN | 103269163 A | 8/2013 |
| CN | 203536986 U | 4/2014 |
| CN | 103825329 A | 5/2014 |
| CN | 103023320 B | 9/2014 |

OTHER PUBLICATIONS

Office Action, including Search Report, for Chinese Patent Application No. 201410174091.0, dated May 23, 2016, 14 pages.

* cited by examiner

POWER SUPPLY INCLUDING BI-DIRECTIONAL DC CONVERTER AND CONTROL METHOD THEREOF

CLAIM OF PRIORITY

This application claims priority to Chinese Application No. 201410166959.2, filed on Apr. 23, 2014 (not published), and claim priority to Chinese Application No. 201410174091.0, filed on Apr. 25, 2014 (published as CN 104092277A), both of which are hereby incorporated by reference.

BACKGROUND OF THE INVENTION

Field of the Invention

The disclosure relates to a power supply and a control method thereof, and more particularly, to a power supply including a bi-directional converter and a control method thereof.

Description of the Related Art

Portable electronic devices, such as mobile phones and wearable electronic devices (for example, head mounted displays), are widely used. The portable electronic devices have larger power consumption while having more and more powerful functions. Using time of a portable electronic device is limited by its battery capacity, which may lead to poor user experience. A mobile power supply has both the functions of charging and supplying power, and may be an auxiliary power supply of the portable electronic device. The mobile power supply typically includes a power supply circuit in addition with a battery (for example, a lithium ion battery).

FIG. 1 is a schematic block diagram illustrating a power supply circuit in a mobile power supply according to the prior art. As shown in FIG. 1, the mobile power supply includes a power supply circuit and a battery 103. The power supply circuit includes a charging circuit 104 and a switching circuit 105. The battery 103 is electrically coupled in series between the charging circuit 104 and the switching circuit 105. The charging circuit 104 is further electrically coupled to an external power source 101. The switching circuit 105 is further electrically coupled to a load 102. In a normal operating state, an input terminal of the charging circuit 104 is electrically coupled to the external power source 101, so that the external power source 101 charges the battery 103 through the charging circuit 104, while supplying power to the load 102 through the switching circuit 105. In a case that the input terminal of the charging circuit 104 is not electrically coupled to the external power source 101, the battery 103 supplies power to the load 102.

In the above power supply circuit according to the prior art, the battery 103 is electrically coupled in series between the charging circuit 104 and the switching circuit 105. Consequently, the charging circuit 104 and the switching circuit 105 must be integrated into different semiconductor chips. The mobile power supply will have two or more semiconductor chips, which leads to complex circuit structure and has reliability issues due to external electrical connections.

BRIEF DESCRIPTION OF THE INVENTION

It is an object of the present disclosure to provide a power supply including a bi-directional DC converter, which has both the functions of charging and supplying power in a single semiconductor chip, and a control method of the power supply.

According to one aspect of the present disclosure, there is provided a power supply including a bi-directional DC converter, comprising: a first terminal being electrically coupled to an external power source; a second terminal being electrically coupled to a load; a third terminal being electrically coupled to a battery; first and second semiconductor switches being electrically coupled in series between the first terminal and the second terminal; and a mode switching means being electrically coupled to the first semiconductor switch, the second semiconductor switch and the bi-directional DC converter, wherein the bi-directional DC converter is further electrically coupled to an intermediate node between the first semiconductor switch and the second semiconductor switch, and to the third terminal, and is operative to switch between a first operating mode in which the battery is charged and a second operating mode in which the battery supplies power to the load.

Preferably, in the power supply, the mode switching means is configured to switch between on and off states of the first and second semiconductor switches, and to switch an operating mode of the bi-directional DC converter.

Preferably, in the power supply, in a case that the external power source is detected when the power supply is activated, the mode switching means is configured to turn on both the first semiconductor switch and the second semiconductor switch, and to control the bi-directional DC converter to operate in the first operating mode, and in a case that the external power source is not detected when the power supply is activated, the mode switching means is configured to turn off the first semiconductor switch, to turn on the second semiconductor switch, and to control the bi-directional DC converter to operate in the second operating mode.

Preferably, in the power supply, in a case that the external power source is not detected when the bi-directional DC converter operates in the first operating mode, the mode switching means turns off the bi-directional DC converter, turns off the first semiconductor switch, and then controls the bi-directional DC converter to operate in the second operating mode, and in a case that the external power source is detected when the bi-directional DC converter operates in the second operating mode, the mode switching means turns off the bi-directional DC converter, turns on the first semiconductor switch, and then controls the bi-directional DC converter to operate in the first operating mode.

Preferably, in the power supply, when the bi-directional DC converter operates in the first operating mode, the mode switching means is operative to turn off the second semiconductor switch so that all amount of power is supplied from the external power source to charge the battery.

Preferably, in the power supply, in a case that one of the external power source, the load and the battery is short-circuited, the mode switching means turns off the respective one of the first semiconductor switch, the second semiconductor switch and the bi-directional DC converter as a protection function of the power supply.

Preferably, in the power supply, when the protection function of the power supply is activated, the power supply maintains at least one of the function of charging the battery and the function of supplying power to the load.

Preferably, in the power supply, the power supply further comprises a third semiconductor switch electrically coupled between the bi-directional DC converter and the third terminal, wherein the mode switching means controls on and off states of the third semiconductor switch.

Preferably, in the power supply, in a case that an output of the bi-directional DC converter is short-circuited, the mode switching means turns off the third semiconductor switch as a protection function of the power supply.

Preferably, in the power supply, in a case that the external power source has an output voltage larger than a rated input voltage of the power supply, the mode switching means turns off the second semiconductor switch.

Preferably, in the power supply, in a case that the external power source has an output voltage larger than a rated input voltage of the power supply, the mode switching means controls the second semiconductor switch to operate in a linear region so that an output voltage supplied through the second semiconductor switch to the load is clamped below a predetermined safety voltage.

Preferably, the power supply further comprises at least one additional terminal, each of which has respective one output voltage to be supplied to respective one load.

Preferably, the power supply further comprises at least one linear regulating circuit, each of which is electrically coupled to respective one of the at least one additional terminal and generates an output voltage from the external power source and the battery.

Preferably, in the power supply, the bi-directional DC converter comprises: an upper semiconductor switch and a lower semiconductor switch which are electrically coupled in series to each other; a magnetic element being electrically coupled to an intermediate node between the upper semiconductor switch and the lower semiconductor switch; and a switching control means for controlling on and off states of each of the upper semiconductor switch and the lower semiconductor switch.

Preferably, in the power supply, the first operating mode is a synchronous buck mode, and the second operating mode is a synchronous boost mode.

Preferably, in the power supply, any of the upper semiconductor switch and the lower semiconductor switch is one selected from a group consisting of an insulated gate bipolar transistor and a metal-oxide-semiconductor field effect transistor.

Preferably, in the power supply, any of the upper semiconductor switch and the lower semiconductor switch is a single metal-oxide-semiconductor field effect transistor having a body diode as an anti-parallel diode.

Preferably, in the power supply, the upper semiconductor switch comprises a first metal-oxide-semiconductor field effect transistor and a second metal-oxide-semiconductor field effect transistor which are of the same type and have sources being electrically coupled to each other and have body diodes as anti-parallel diodes.

Preferably, in the power supply, the upper semiconductor switch comprises a first metal-oxide-semiconductor field effect transistor and a second metal-oxide-semiconductor field effect transistor which are of the same type and have drains being electrically coupled to each other and have body diodes as anti-parallel diodes.

Preferably, in the power supply, any of the first semiconductor switch and the second semiconductor switch is one selected from a group consisting of an insulated gate bipolar transistor and a metal-oxide-semiconductor field effect transistor.

Preferably, in the power supply, any of the first semiconductor switch and the second semiconductor switch is a single metal-oxide-semiconductor field effect transistor having a body diode as an anti-parallel diode.

Preferably, in the power supply, any of the first semiconductor switch and the second semiconductor switch comprises a first metal-oxide-semiconductor field effect transistor and a second metal-oxide-semiconductor field effect transistor which are of the same type, have sources being electrically coupled to each other and have body diodes as anti-parallel diodes.

Preferably, in the power supply, any of the first semiconductor switch and the second semiconductor switch comprises a first metal-oxide-semiconductor field effect transistor and a second metal-oxide-semiconductor field effect transistor which are of the same type, have drains being electrically coupled to each other and have body diodes as anti-parallel diodes.

According to another aspect of the present disclosure, there is provided a control method of a power supply having a first terminal being electrically coupled to an external power source, a second terminal being electrically coupled to a load, and a third terminal being electrically coupled to a battery, the method comprising: detecting states of the external power source, the load and the battery; and switching a bi-directional DC converter between a first operating mode in which the battery is charged and a second operating mode in which the battery supplies power to the load, in accordance with the states of the external power source, the load and the battery.

Preferably, in the control method, the step of switching comprises: electrically coupling the power supply to the external power source and the load, and controlling the bi-directional DC converter to operate in the first operating mode, in a case that the external power source is detected when the power supply is activated, and disconnecting the power supply from the external power source, electrically coupling the power supply to the load, and controlling the bi-directional DC converter to operate in the second operating mode, in a case that the external power source is not detected when the power supply is activated.

Preferably, in the control method, the step of switching comprises: turning off the bi-directional DC converter, disconnecting the power supply from the external power source, and then controlling the bi-directional DC converter to operate in the second operating mode, in a case that the external power source is not detected when the bi-directional DC converter operates in the first operating mode, and turning off the bi-directional DC converter, electrically coupling the power supply to the external power source, and then controlling the bi-directional DC converter to operate in the first operating mode, in a case that the external power source is detected when the bi-directional DC converter operates in the second operating mode.

Preferably, in the control method, the step of switching comprises: operatively disconnecting the power supply from the load so that all amount of power is supplied from the external power source to charge the battery when the bi-directional DC converter operates in the first operating mode.

Preferably, in the control method, the step of switching comprises: disconnecting the power supply from one of the external power source, the load and the battery as a protection function of the power supply, in a case that respective one of the external power source, the load and the battery is short-circuited.

Preferably, in the control method, when the protection function of the power supply is activated, the power supply maintains at least one of the function of charging the battery and the function of supplying power to the load.

Preferably, in the control method, the step of switching comprises: disconnecting the power supply from the load, in a case that the external power source has an output voltage larger than a rated input voltage of the power supply.

Preferably, in the control method, the step of switching comprises: clamping an output voltage supplied to the load below a safety voltage, in a case that the external power source has an output voltage larger than a rated input voltage of the power supply.

Preferably, in the control method, the first operating mode is a synchronous buck mode, and the second operating mode is a synchronous boost mode.

The power supply and the control method thereof according to the present disclosure include a mode switching means for controlling the first and second semiconductor switches, respectively. Thus, a single semiconductor chip provides both the function of charging and the function of supplying power. The mode switching means coordinates operations of the first semiconductor switch, the second semiconductor switch and the bi-directional DC converter. Accordingly, the external power source, the load, the battery, and the bi-directional DC converter are all protected from damage when an operating mode is changed. Moreover, the change of the operating mode is smoothed to minimize adverse effects on the power supply and external elements.

In a preferable embodiment, the mode switching means turns off one of the first semiconductor switch, the second semiconductor switch and the bi-directional DC converter as a protection function of the power supply, in a case that the respective one of the external power source, the load and the battery is short-circuited. Even in the case that one of the external power source, the load and the battery is short-circuited, electronic elements in other ones of the external power source, the load and the battery and in the power supply are protected from damage, and the power supply maintains at least one of the functions of charging the battery and supplying power to the load.

In a preferable embodiment, in a case that a user selects rapid charging function when the bi-directional DC converter operates in the first operating mode, the mode switching means is operative to turn off the second semiconductor switch so that all amount of power is supplied from the external power source to the battery. When the battery is fully charged, the mode switching means turns on the second semiconductor switch so that the external power source supplies power to the load again. Thus, the power supply also provides rapid charging function.

BRIEF DESCRIPTION OF THE DRAWINGS

The above and other objects, advantages and features of the present invention will become more fully understood from the detailed description given herein below in connection with the appended drawings, and wherein.

DETAILED DESCRIPTION OF EMBODIMENTS OF THE INVENTION

Figure 1:
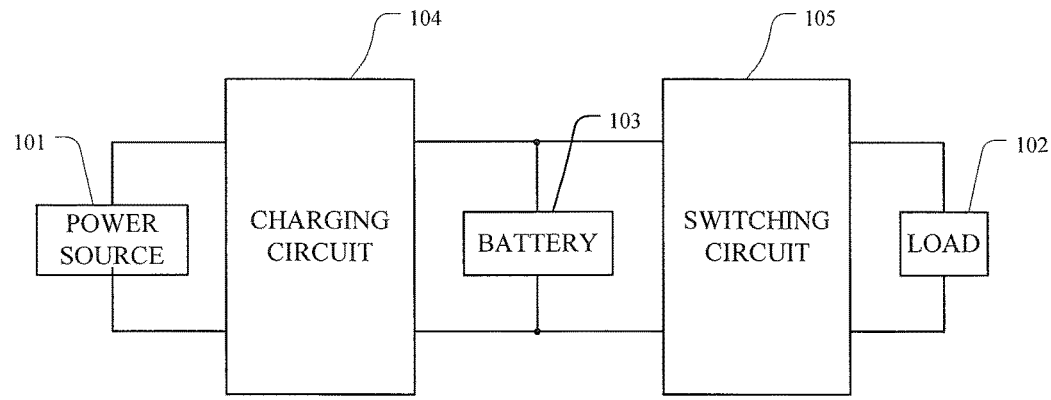
FIG. 1 is a schematic block diagram illustrating a power supply according to the prior art.

Reference will now be made in detail to particular embodiments of the disclosure. One skilled person can understand that attached drawings herein are only illustrative and may not be drawn to scale. In other instances, well-known methods, procedures, processes, components, and circuits have not been described in detail so as not to unnecessarily obscure aspects of the present invention. The same or similar reference numerals in different figures may denote the same or similar elements.

It should be understood that one element may be coupled to or connected to another element directly or through an intermediate element when the one element is described as being "coupled to" or "connected to" the another element. Coupling between elements may be either physical or logical one, or both. On the contrary, there will be no intermediate element when the one element is described as being "coupled directly to" or "connected directly to" the another element.

Figure 2:
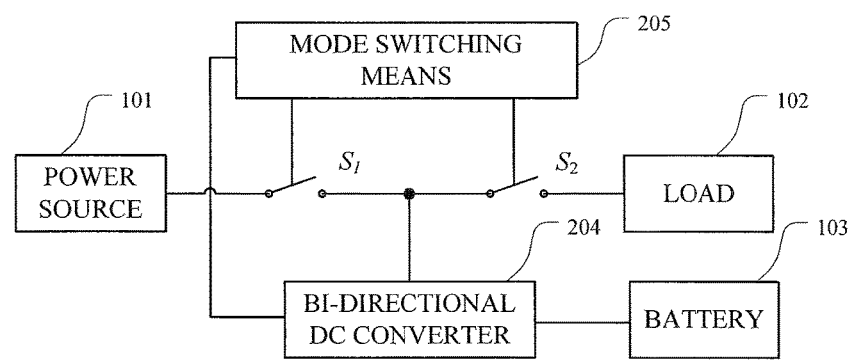
FIG. 2 is a schematic block diagram illustrating a power supply according to a first embodiment of the present disclosure.

FIG. 2 is a schematic block diagram illustrating a power supply according to a first embodiment of the present disclosure. As shown in FIG. 2, the mobile power supply includes a power supply circuit and a battery 103. The power supply includes a first semiconductor switch S1, a second semiconductor switch S2, a bi-directional DC converter 204, and a mode switching means 205. The first semiconductor switch S1 and the second semiconductor switch S2 are electrically coupled in series between an external power source 101 and a load 102. The bi-directional DC converter 204 is electrically coupled to an intermediate node of the first semiconductor switch S1 and the second semiconductor switch S2, and to the battery 103. The mode switching means 205 is electrically coupled to the first semiconductor switch S1, the second semiconductor switch S2 and the bi-directional DC converter 204. One terminal of the first semiconductor switch S1 is electrically coupled to the external power source 101, as a first terminal of the power supply. One terminal of the second semiconductor switch S2 is electrically coupled to the load 102, as a second terminal of the power supply. One terminal of the bi-directional DC converter 204 is electrically coupled to the battery 103, as a third terminal of the power supply. Except for fewer discrete components, the power supply can be integrated into a single chip.

The load 102 may be a mobile phone or a wearable electronic device (for example, a head mounted display). The battery 103 may be any electrical storage element which can be charged and discharged, such as a lithium ion battery. Any of the first semiconductor switch S1 and the second semiconductor switch S2 may be an insulated gate bipolar transistor (IGBT) or a metal-oxide-semiconductor field effect transistor (MOSFET).

The external power source 101 may be detected by sensing an input current at the first terminal. For example, when the input current is larger than zero, it is determined that the first terminal is electrically coupled to the external power source 101, and when the input current is equal to zero, it is determined that the first terminal is not electrically coupled to the external power source 101.

When the power supply is activated, the mode switching means 205 controls on and off states of the first semiconductor switch S1 and the second semiconductor switch S2 and an operating mode of the bi-directional converter 204 in accordance with the existence of the external power source 101. In a case that the external power source 101 is detected, the mode switching means 205 turns on the first semiconductor switch S1 and the second semiconductor switch S2, and controls the bi-directional DC converter 204 to operate in a first operating mode (for example, a synchronous buck mode). An output voltage to the battery 103 is less than an input voltage of the external power source 101, and the external power source 101 charges the battery 103 through the bi-directional DC converter 204. The second semiconductor switch S2 is turned on, so that a part of power is supplied from the external power source 101 to the load 102. The external power source 101 may not be detected in a case that the external power source 101 does not exist, or is in a poor supplying state. The mode switching means 205 turns off the first semiconductor switch S1, turns on the second semiconductor switch S2, and controls the bi-directional DC converter 204 to operate in a second operating mode (for example, a synchronous boost mode). The battery 103 supplies power to the load 102 through the bi-directional DC converter 204.

During operation of the power supply, the mode switching means 205 controls on and off states of the first semiconductor switch S1 and an operating mode of the bi-directional converter 204 in accordance with the existence of the external power source 101. In a case that the external power source 101 is not detected when the bi-directional DC converter 204 operates in the first operating mode, the mode switching means 205 turns off the bi-directional DC converter 204, turns off the first semiconductor switch S1, and then controls the bi-directional DC converter 204 to operate in the second operating mode. In a case that the external power source 101 is detected when the bi-directional DC converter 204 operates in the second operating mode, the mode switching means 205 turns off the bi-directional DC converter 204, turns on the first semiconductor switch S1, and then controls the bi-directional DC converter 204 to operate in the first operating mode.

In a case that a user selects rapid charging function when the bi-directional DC converter 204 operates in the first operating mode, the mode switching means 205 is operative to turn off the second semiconductor switch S2 so that all amount of power is supplied from the external power source 101 to the battery 103. When the battery 103 is fully charged, the mode switching means 205 turns on the second semiconductor switch S2 so that the external power source 101 supplies power to the load 102 again. Thus, the power supply also provides rapid charging function.

At the moment when the power supply is activated and during operation of the power supply, the mode switching means 205 controls on and off states of the first semiconductor switch S1 and the second semiconductor switch S2 and an operating mode of the bi-directional converter 204 in accordance with short-circuit detection of the external power source 101, the load 102 and the battery 103. In a case that the external power source 101 is short-circuited, the mode switching means 205 turns off the first semiconductor switch S1, turns on the second semiconductor switch S2, and controls the bi-directional DC converter 204 to operate in a second operating mode (for example, a synchronous boost mode). Thus, the battery 103 supplies power to the load 102 through the bi-directional DC converter 204. In a case that the load 102 is short-circuited, the mode switching means 205 turns off the second semiconductor switch S2, turns on the first semiconductor switch S1, and controls the bi-directional DC converter 204 to operate in a first operating mode (for example, a synchronous boost mode). An output voltage to the battery 103 is less than an input voltage of the external power source 101, and the external power source 101 charges the battery 103 through the bi-directional DC converter 204. In a case that the battery 103 is short-circuited, the mode switching means 205 turns off the bi-directional DC converter 204, turns on the first semiconductor switch S1, and turns on the second semiconductor switch S2. Thus, the external power source 101 supplies power directly to the load 102. In a case that an output voltage the external power source 101 is larger than a rated input voltage of power supply, the mode switching means 205 turns off the second semiconductor switch S2, as a protection function for protecting the load 102. Alternatively, in a case that an output voltage of the external power source 101 is larger than a rated input voltage of the power supply, the mode switching means 205 controls the second semiconductor switch S2 to operate in a linear region so that an output voltage supplied to the load 102 is clamped below a predetermined safety voltage.

In the power supply according to the first embodiment, even in the case that one of the external power source 101, the load 102 and the battery 103 is short-circuited, electronic elements in other ones of the external power source, the load and the battery and in the power supply are protected from damage, and the power supply maintains at least one of the functions of charging the battery 103 and supplying power to the load 102.

Figure 3:
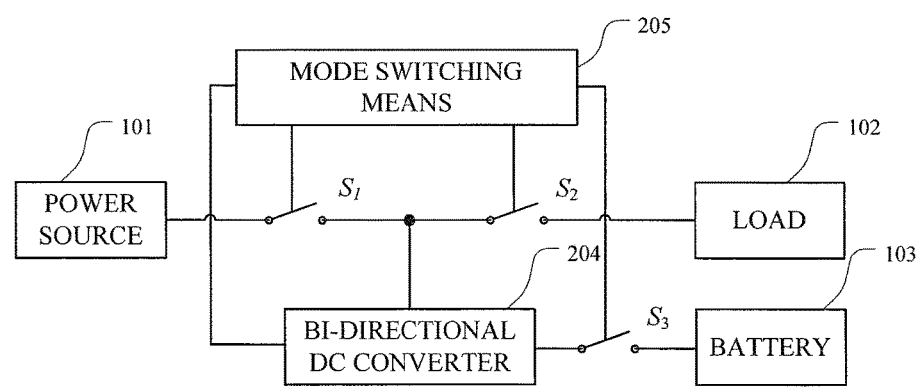
FIG. 3 is a schematic block diagram illustrating a power supply according to a second embodiment of the present disclosure.

FIG. 3 is a schematic block diagram illustrating a power supply according to a second embodiment of the present disclosure. The power supply according to the second embodiment differs from that according to the first embodiment in that a third semiconductor switch S3 is added. The third semiconductor switch S3 is electrically coupled between the bi-directional DC converter 204 and the battery 103. The mode switching means 205 is electrically coupled to the first semiconductor switch S1, the second semiconductor switch S2, the third semiconductor switch S3, and the bi-directional DC converter 204. One terminal of the first semiconductor switch S1 is electrically coupled to the external power source 101, as a first terminal of the power supply. One terminal of the second semiconductor switch S2 is electrically coupled to the load 102, as a second terminal of the power supply. One terminal of the third semiconductor switch S3 is electrically coupled to the battery 103, as a third terminal of the power supply. Other aspects of the power supply according to the second embodiment of the disclosure are the same as those of the power supply according to the first embodiment of the disclosure. Except for fewer discrete components, the power supply can be integrated into a single chip.

The external power source 101 may be detected by sensing an input current at the first terminal. For example, when the input current is larger than zero, the first terminal is electrically coupled to the external power source 101, and when the input current is equal to zero, the first terminal is not electrically coupled to the external power source 101.

When the power supply is activated, the mode switching means 205 controls on and off states of the first semiconductor switch S1, the second semiconductor switch S2 and the third semiconductor switch S3 and an operating mode of the bi-directional converter 204 in accordance with the existence of the external power source 101. In a case that the external power source 101 is detected, the mode switching means 205 turns on the first semiconductor switch S1, the second semiconductor switch S2 and the third semiconductor switch S3, and controls the bi-directional DC converter 204 to operate in a first operating mode (for example, a synchronous buck mode). An output voltage to the battery 103 is less than an input voltage of the external power source 101, and the external power source 101 charges the battery 103 through the bi-directional DC converter 204. The second semiconductor switch S2 is turned on, so that a part of power is supplied from the external power source 101 to the load 102. The external power source 101 may not be detected in a case that the external power source 101 does not exist, or is in a poor supplying state. The mode switching means 205 turns off the first semiconductor switch S1, turns on the second semiconductor switch S2, turns on the third semiconductor switch S3, and controls the bi-directional DC converter 204 to operate in a second operating mode (for example, a synchronous boost mode). The battery 103 supplies power to the load 102 through the bi-directional DC converter 204.

During operation of the power supply, the mode switching means 205 controls on and off states of the first semiconductor switch S1 and the third semiconductor switch S3, and an operating mode of the bi-directional converter 204 in accordance with the existence of the external power source 101. In a case that the external power source 101 is not detected when the bi-directional DC converter 204 operates in the first operating mode, the mode switching means 205 turns off the bi-directional DC converter 204, turns off the first semiconductor switch S1, and then controls the bi-directional DC converter 204 to operate in the second operating mode, while maintaining the third semiconductor switch S3 in a on state. In a case that the external power source 101 is detected when the bi-directional DC converter 204 operates in the second operating mode, the mode switching means 205 turns off the bi-directional DC converter 204, turns on the first semiconductor switch S1, and then controls the bi-directional DC converter 204 to operate in the first operating mode, while maintaining the third semiconductor switch S3 in a on state.

In a case that a user selects rapid charging function when the bi-directional DC converter 204 operates in the first operating mode, the mode switching means 205 is operative to turn off the second semiconductor switch S2 so that all amount of power is supplied from the external power source 101 to the battery 103. When the battery 103 is fully charged, the mode switching means 205 turns on the second semiconductor switch S2 so that the external power source 101 supplies power to the load 102 again. Thus, the power supply also provides rapid charging function.

At the moment when the power supply is activated and during operation of the power supply, the mode switching means 205 controls on and off states of the first semiconductor switch S1 and the second semiconductor switch S2 and the third semiconductor switch S3 and an operating mode of the bi-directional converter 204 in accordance with short-circuit detection of the external power source 101, the load 102 and the battery 103. In a case that the external power source 101 is short-circuited, the mode switching means 205 turns off the first semiconductor switch S1, turns on the second semiconductor switch S2, and controls the bi-directional DC converter 204 to operate in a second operating mode (for example, a synchronous boost mode), while maintaining the third semiconductor switch S3 in a on state. Thus, the battery 103 supplies power to the load 102 through the bi-directional DC converter 204. In a case that the load 102 is short-circuited, the mode switching means 205 turns off the second semiconductor switch S2, turns on the first semiconductor switch S1, and controls the bi-directional DC converter 204 to operate in a first operating mode (for example, a synchronous boost mode), while maintaining the third semiconductor switch S3 in a on state. An output voltage to the battery 103 is less than an input voltage of the external power source 101, and the external power source 101 charges the battery 103 through the bi-directional DC converter 204. In a case that the battery 103 is short-circuited, the mode switching means 205 turns off the bi-directional DC converter 204, turns on the first semiconductor switch S1, turns on the second semiconductor switch S2, and turns off the third semiconductor switch S3. Thus, the external power source 101 supplies power directly to the load 102. In a case that an output voltage the external power source 101 is larger than a rated input voltage of power supply, the mode switching means 205 turns off the second semiconductor switch S2, as a protection function for protecting the load 102. Alternatively, in a case that an output voltage of the external power source 101 is larger than a rated input voltage of the power supply, the mode switching means 205 controls the second semiconductor switch S2 to operate in a linear region so that an output voltage supplied to the load 102 is clamped below a predetermined safety voltage.

In the power supply according to the second embodiment, even in the case that one of the external power source 101, the load 102 and the battery 103 is short-circuited, electronic elements in other ones and in the power supply (?)are protected from damage, and the power supply maintains at least one of the functions of charging the battery 103 and supplying power to the load 102.

Figure 4:
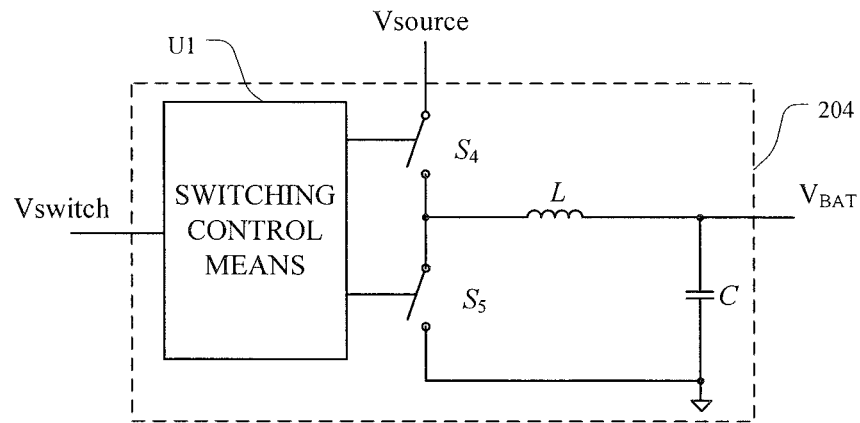
FIG. 4 is a schematic block diagram illustrating a bi-directional DC converter used in the power supply according to an embodiment of the present disclosure.

FIG. 4 is a schematic block diagram illustrating a bi-directional DC converter 204 used in the power supply according to an embodiment of the present disclosure. The bi-directional DC converter 204 has a first terminal for receiving power from the external power source or supplying power to the load, a second terminal for supplying power to the battery or receiving power from the battery, and a third terminal for receiving a mode control signal from the mode switching means. In the example as shown in FIG. 4, the first terminal of the bi-directional DC converter 204 receives or provides a voltage signal Vsource, the second terminal of the bi-directional DC converter 204 receives or provides a voltage VBAT, and the third terminal of the bi-directional DC converter 204 receives a voltage signal Vswitch.

An upper semiconductor switch S4 and a lower semiconductor switch S5 are electrically coupled in series between the first terminal and ground. A switching control means U1 is electrically coupled to the third terminal, and is electrically coupled to each of the upper semiconductor switch S4 and the lower semiconductor switch S5, for controlling on and off states of the upper semiconductor switch S4 and the lower semiconductor switch S5, respectively. A magnetic element L, such as an inductor, is electrically coupled to an intermediate node between the upper semiconductor switch S4 and the lower semiconductor switch S5, and to the second terminal of the bi-directional DC converter 204. A capacitor C is electrically coupled between the second terminal of the bi-directional DC converter 204 and the ground. It should be noted that the capacitor C is only optional and can be omitted in a case that the load 102 is a capacitive one.

The switching control means U1 generate different switching control signals in response to the received mode control signal, for controlling on and off states of the upper semiconductor switch S4 and the lower semiconductor switch S5, to switch an operating mode of the bi-directional DC converter 204.

When the external power source is detected, the switching control means U1 controls the bi-directional DC converter 204 to operate in the first operating mode in response to the mode control signal. The first operating mode herein is a synchronous buck mode. In the first operating mode, the upper semiconductor switch S4, the lower semiconductor switch S5, the inductor L and the capacitor C constitute the synchronous buck converter, which charges the battery 103 with the power supplied from the external power source 101.

When the external power source is not detected, the switching control means U1 controls the bi-directional DC converter 204 to operate in the second operating mode in response to the mode control signal. The second operating mode herein is a synchronous boost mode. In the second operating mode, the upper semiconductor switch S4, the lower semiconductor switch S5, the inductor L and the capacitor C constitute the synchronous boost converter, which supplies power from the battery 103 to the load 102.

FIGS. 5A to 5E illustrate examples of the semiconductor switches used in the power supply according to an embodiment of the present disclosure. In the above-mentioned power supply, the first semiconductor S1 to the third semiconductor switch S3, the upper semiconductor switch S4 and the lower semiconductor switch S5 may be of the same type or different types. Any of the above semiconductor switches may be an insulated gate bipolar transistor (IGBT) or a metal-oxide-semiconductor field effect transistor (MOSFET). In case of the MOSFET, the semiconductor switch may be of the N-type or the P-type.

Figure 5A:
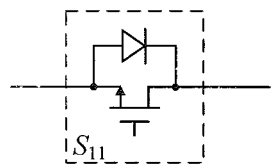
FIGS. 5A to 5E illustrate examples of the semiconductor switches used in the power supply according to an embodiment of the present disclosure.
Figure 5B:
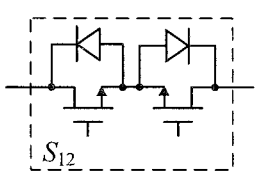
Figure 5C:
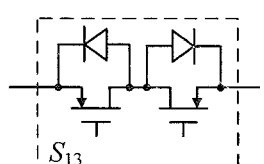
Figure 5D:
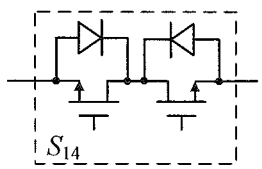
Figure 5E:
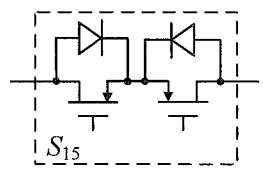

In an example, the semiconductor switch S11 is a single N-type MOSFET and has a body diode as an anti-parallel diode, as shown in FIG. 5A. In another example, the semiconductor switch S12 includes two N-type MOSFETs which are electrically coupled in series to each other and have body diodes as anti-parallel diode, as shown in FIG. 5B. One driving circuit may be used for driving two N-type MOSFETs simultaneously in the semiconductor switch S12. In a further example, the semiconductor switch S13 includes two P-type MOSFETs which are electrically coupled in series to each other and have body diodes as anti-parallel diode, as shown in FIG. 5C. One driving circuit may be used for driving two P-type MOSFETs simultaneously in the semiconductor switch S13. In another example, the semiconductor switch S14 includes two N-type MOSFETs which are electrically coupled in series to each other and have body diodes as anti-parallel diode, as shown in FIG. 5D. Two driving circuits may be used for driving two N-type MOSFETs in the semiconductor switch S14. In a further example, the semiconductor switch S15 includes two P-type MOSFETs which are electrically coupled in series to each other and have body diodes as anti-parallel diode, as shown in FIG. 5E. Two driving circuits may be used for driving two P-type MOSFETs in the semiconductor switch S15.

The above-mentioned semiconductor switches S12 to S15 may each include two MOSFETs which are of the same type and electrically coupled in series to each other. At least in a period of operating cycles, two MOSFETs are both in on or off states so that the semiconductor switch is turned on or off. Accordingly, such semiconductor switch can reduce voltage stress in each of the two MOSFETs.

In the above embodiments, the power supply is used for driving a single load which is electrically coupled to the second semiconductor switch S2. In an alternative embodiment, the power supply according to the present disclosure includes multiple outputs, which provide different output voltages for driving multiple loads independently. Each output include respective one semiconductor switch, and respective one linear regulating circuit which is an upstream device or a downstream device with respect to the respective one semiconductor switch. The linear regulating circuit generates an output voltage with a predetermined value from the power of the external power source or the battery. In an example, the power supply is used for driving two loads, one of which provides an output voltage of 3.3V directly from the external power supply, the other of which provides an output voltage of 1.8V through a linear regulating circuit with a conversion factor of $1.8/3.3$. Operating modes and protection functions of the power supply are achieved by using semiconductor switches being electrically coupled to different loads.

Figure 6:
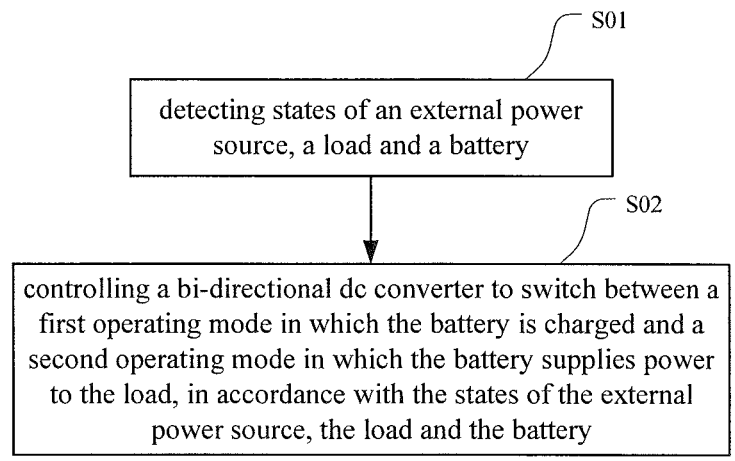
FIG. 6 is a flowchart illustrating a control method of the power supply according to an embodiment of the present disclosure.

FIG. 6 is a flowchart illustrating a control method of the power supply according to an embodiment of the present disclosure. The power supply has a first terminal being electrically coupled to an external power source, a second terminal being electrically coupled to a load, and a third terminal being electrically coupled to a battery. In step S01, the power supply detects states of the external power source, the load and the battery. In step S02, the power supply controls a bi-directional DC converter to switch between a first operating mode in which the battery is charged and a second operating mode in which the battery supplies power to the load, in accordance with the states of the external power source, the load and the battery. For example, the first operating mode is a synchronous buck mode, and the second operating mode is a synchronous boost mode.

Preferably, the step of switching comprises: electrically coupling the power supply to the external power source and the load, and controlling the bi-directional DC converter to operate in the first operating mode, in a case that the external power source is detected when the power supply is activated, and disconnecting the power supply from the external power source, electrically coupling the power supply to the load, and controlling the bi-directional DC converter to operate in the second operating mode, in a case that the external power source is not detected when the power supply is activated.

Preferably, the step of switching comprises: turning off the bi-directional DC converter, disconnecting the power supply from the external power source, and then controlling the bi-directional DC converter to operate in the second operating mode, in a case that the external power source is not detected when the bi-directional DC converter operates in the first operating mode, and turning off the bi-directional DC converter, electrically coupling the power supply to the external power source, and then controlling the bi-directional DC converter to operate in the first operating mode, in a case that the external power source is detected when the bi-directional DC converter operates in the second operating mode.

Preferably, the step of switching comprises: operatively disconnecting the power supply from the load so that all amount of power is supplied from the external power source to charge the battery when the bi-directional DC converter operates in the first operating mode.

Preferably, the step of switching comprises: disconnecting the power supply from one of the external power source, the load and the battery as a protection function of the power supply, in a case that respective one of the external power source, the load and the battery is short-circuited.

Preferably, when the protection function of the power supply is activated, the power supply maintains at least one of the function of charging the battery and the function of supplying power to the load.

Although various embodiments of the present invention are described above, these embodiments neither present all details, nor imply that the present invention is limited to these embodiments. Obviously, many modifications and changes may be made in light of the teaching of the above embodiments. These embodiments are presented and some details are described herein only for explaining the principle of the invention and its actual use, so that one skilled person can practice the present invention and introduce some modifications in light of the invention. The invention is intended to cover alternatives, modifications and equivalents that may be included within the spirit and scope of the invention as defined by the appended claims.

What is claimed is:

1. A power supply including a bi-directional DC converter, comprising:
a first terminal being electrically coupled to an external power source;
a second terminal being electrically coupled to a load;
a third terminal being electrically coupled to a battery;
first and second semiconductor switches being electrically coupled in series between said first terminal and said second terminal;
a mode switching means being electrically coupled to said first semiconductor switch, said second semiconductor switch and said bi-directional DC converter,
wherein said bi-directional DC converter comprises an upper semiconductor switch and a lower semiconductor switch which are electrically coupled in series to each other between an intermediate node between said first semiconductor switch and said second semiconductor switch and ground, a magnetic element being electrically coupled to an intermediate node between said upper semiconductor switch and said lower semiconductor switch, and a switching control means for controlling on and off states of each of said upper semiconductor switch and said lower semiconductor switch, so that said bi-directional DC converter is operative to switch between a first operating mode in which said battery is charged and a second operating mode in which said battery supplies power to said load; and in said first operating mode, said first semiconductor switch is turned on so that said external power source charges said battery through said first semiconductor switch, said intermediate node and said bi-directional DC converter, and said second semiconductor switch is turned off for providing a rapid charging function, or is turned on for supplying power to said load through said first semiconductor switch, said intermediate node and said second semiconductor switch, and in said second operating mode, said first semiconductor switch is turned off and said second semiconductor switch is turned on so that said battery supplies power to said load through said bi-directional DC converter, said intermediate node and said second semiconductor switch.

2. The power supply according to claim 1, wherein said mode switching means is configured to switch between on and off states of said first and second semiconductor switches, and to switch an operating mode of said bi-directional DC converter.

3. The power supply according to claim 2, wherein in a case that said external power source is detected when said power supply is activated, said mode switching means is configured to control said bi-directional DC converter to operate in said first operating mode, and in a case that said external power source is not detected when said power supply is activated, said mode switching means is configured control said bi-directional DC converter to operate in said second operating mode.

4. The power supply according to claim 2, wherein in a case that said external power source is not detected when said bi-directional DC converter operates in said first operating mode, said mode switching means turns off said bi-directional DC converter, turns off said first semiconductor switch, and then controls said bi-directional DC converter to operate in said second operating mode, and in a case that said external power source is detected when said bi-directional DC converter operates in said second operating mode, said mode switching means turns off said bi-directional DC converter, turns on said first semiconductor switch, and then controls said bi-directional DC converter to operate in said first operating mode.

5. The power supply according to claim 2, wherein in a case that one of said external power source, said load and said battery is short-circuited, said mode switching means turns off said respective one of said first semiconductor switch, said second semiconductor switch and said bi-directional DC converter as a protection function of said power supply.

6. The power supply according to claim 5, wherein when said protection function of said power supply is activated, said power supply maintains at least one of said function of charging said battery and said function of supplying power to said load.

7. The power supply according to claim 2, further comprising a third semiconductor switch electrically coupled between said bi-directional DC converter and said third terminal, wherein said mode switching means controls on and off states of said third semiconductor switch.

8. The power supply according to claim 7, wherein in a case that an output of said bi-directional DC converter is short-circuited, said mode switching means turns off said third semiconductor switch as a protection function of said power supply.

9. The power supply according to claim 2, wherein in a case that said external power source has an output voltage larger than a rated input voltage of said power supply, said mode switching means turns off said second semiconductor switch.

10. The power supply according to claim 2, wherein in a case that said external power source has an output voltage larger than a rated input voltage of said power supply, said mode switching means controls said second semiconductor switch to operate in a linear region so that an output voltage supplied through said second semiconductor switch to said load is clamped below a predetermined safety voltage.

11. The power supply according to claim 2, further comprising at least one additional terminal, each of which has respective one output voltage to be supplied to respective one load.

12. The power supply according to claim 11, further comprising at least one linear regulating circuit, each of which is electrically coupled to respective one of said at least one additional terminal and generates an output voltage from said external power source and said battery.

13. The power supply according to claim 1, wherein said first operating mode is a synchronous buck mode, and said second operating mode is a synchronous boost mode.

14. The power supply according to claim 1, wherein any of said upper semiconductor switch and said lower semiconductor switch is one selected from a group consisting of an insulated gate bipolar transistor and a metal-oxide-semiconductor field effect transistor.

15. The power supply according to claim 1, wherein in a case that said battery is short-circuited, said mode switching means turns off said bi-directional DC converter as a protection function of said power supply, while said external power source supplies power to said load.

16. A control method of a power supply having a first terminal being electrically coupled to an external power source, a second terminal being electrically coupled to a load, a third terminal being electrically coupled to a battery, and first and second semiconductor switches being electrically coupled in series between said first terminal and said second terminal and a bi-directional DC converter which is electrically coupled to an intermediate node between said first semiconductor switch and said second semiconductor switch, said method comprising:
   detecting states of said external power source, said load and said battery; and
   switching said bi-directional DC converter between a first operating mode in which said battery is charged and a second operating mode in which said battery supplies power to said load, in accordance with said states of said external power source, said load and said battery,
   wherein said bi-directional DC converter comprises an upper semiconductor switch and a lower semiconductor switch which are electrically coupled in series to each other between an intermediate node between said first semiconductor switch and said second semiconductor switch and ground, a magnetic element being electrically coupled to an intermediate node between said upper semiconductor switch and said lower semiconductor switch, and a switching control means for controlling on and off states of said upper semiconductor switch and said lower semiconductor switch, so that said bi-directional DC converter is operative to switch between said first operating mode in which said battery is charged and said second operating mode in which said battery supplies power to said load, and
   in said first operating mode, said first semiconductor switch is turned on so that said external power source charges said battery through said first semiconductor switch, said intermediate node and said bi-directional DC converter, and said second semiconductor switch is turned off for providing a rapid charging function, or is turned on for supplying power to said load through said first semiconductor switch, said intermediate node and said second semiconductor switch, and
   in said second operating mode, said first semiconductor switch is turned off and said second semiconductor switch is turned on so that said battery supplies power to said load through said bi-directional DC converter, said intermediate node and said second semiconductor switch.

17. The control method according to claim 16, wherein said step of switching comprises:
   electrically coupling said power supply to said external power source and said load, and controlling said bi-directional DC converter to operate in said first operating mode, in a case that said external power source is detected when said power supply is activated, and
   disconnecting said power supply from said external power source, electrically coupling said power supply to said load, and controlling said bi-directional DC converter to operate in said second operating mode, in a case that said external power source is not detected when said power supply is activated.

18. The control method according to claim 16, wherein said step of switching comprises:
   turning off said bi-directional DC converter, disconnecting said power supply from said external power source, and then controlling said bi-directional DC converter to operate in said second operating mode, in a case that said external power source is not detected when said bi-directional DC converter operates in said first operating mode, and
   turning off said bi-directional DC converter, electrically coupling said power supply to said external power source, and then controlling said bi-directional DC converter to operate in said first operating mode, in a case that said external power source is detected when said bi-directional DC converter operates in said second operating mode.

19. The control method according to claim 16, wherein said step of switching comprises:
   disconnecting said power supply from one of said external power source, said load and said battery as a protection function of said power supply, in a case that respective one of said external power source, said load and said battery is short-circuited.

20. The control method according to claim 19, wherein when said protection function of said power supply is activated, said power supply maintains at least one of said function of charging said battery and said function of supplying power to said load.

21. The control method according to claim 16, wherein said step of switching comprises:
   disconnecting said power supply from said load, in a case that said external power source has an output voltage larger than a rated input voltage of said power supply.

22. The control method according to claim 16, wherein said step of switching comprises:
   clamping an output voltage supplied to said load below a predetermined safety voltage, in a case that said external power source has an output voltage larger than a rated input voltage of said power supply.

23. The control method according to claim 16, wherein said first operating mode is a synchronous buck mode, and said second operating mode is a synchronous boost mode.

24. The control method according to claim 16, wherein in a case that said battery is short-circuited, said bi-directional DC converter is turned off as a protection function of said power supply, while said external power source supplies power to said load.

* * * * *